United States Patent [19]

Suzuki et al.

[11] 4,343,489
[45] Aug. 10, 1982

[54] SEATBELT SYSTEM

[75] Inventors: Ichiro Suzuki, Nagoya; Masanao Motonami; Hisashi Ogawa, both of Toyota, all of Japan

[73] Assignee: Toyota Jidosha Kogyo Kabushiki Kaisha, Toyota, Japan

[21] Appl. No.: 150,133

[22] Filed: May 15, 1980

[30] Foreign Application Priority Data

May 21, 1979 [JP] Japan ............................. 54-68753[U]

[51] Int. Cl.³ .............................................. B60R 21/02
[52] U.S. Cl. ................................................... 280/804
[58] Field of Search ............... 280/804, 802, 803, 808; 297/469

[56] References Cited

U.S. PATENT DOCUMENTS 4,061,365 12/1977 Nagano ............................. 280/804
4,070,040 1/1978 Igeta .................................. 280/804
4,213,652 7/1980 Irwin ................................. 280/804

Primary Examiner—Robert R. Song
Attorney, Agent, or Firm—Stevens, Davis, Miller & Mosher

[57] ABSTRACT

According to the present invention, in a seatbelt system, in which an end of an occupant restraining webbing is connected to a slider and this slider travels along a guide rail laid on a vehicle body so as to cause the webbing to approach or recede from the body of an occupant, the slider includes: a head; a body suspended from a central portion in cross-section of the head and inserted through a driving tape; and a leg extended from the lower end of the body and secured with an anchor plate, to which the webbing is connected, and the guide rail includes: a substantially letter 'T' shaped sliding groove consisting of a head groove portion for slidably guiding the head of slider and a body groove portion for slidably guiding the body of slider; and a tape groove perpendicularly intersecting the body groove portion of the sliding groove for receiving and guiding the driving tape.

9 Claims, 9 Drawing Figures

SEATBELT SYSTEM

BACKGROUND OF THE INVENTION

1. Field of the Invention

The present invention relates to seatbelt systems for restraining and protecting an occupant of a vehicle in an emergency situation of the vehicle such as a collision, and more particularly, a seatbelt system capable of automatically fastening a restraining webbing to the occupant after the occupant is seated.

2. Description of the Prior Art

Since the seatbelt system protects occupants of the vehicle by restraining them with a webbing during vehicular emergencies, the occupants in the vehicles do not collide with dangerous objects such as a steering wheel and their safety is insured. However, for reasons such as the difficulty of fastening the restraining webbing, the percentage of occupants wearing such webbings is very low.

For this reason, seatbelt systems which automatically fasten the restraining webbing to the occupant after he has seated himself have been proposed. These seatbelt systems have a guide rail provided in or on the car body and the webbing is caused to approach or move away from the seated occupant to permit automatic fastening or unfastening of the webbing by means of a slider to which the end of the webbing is attached and which is caused to move along the guide rail.

In this type of the seatbelt system as described above, when the occupant enters or leaves the vehicle, it is necessary that the slider is quickly and smoothly moved along the guide rail, and further, that the slider and guide rail have strengths sufficient for reliably restraining and protecting the occupant in an emergency situation of the vehicle. Furthermore, it is desirable that the slider and guide rail are rendered as compact as possible in volume, and further, have forms of not protruding into the compartment of the vehicle, because both the slider and guide rail are provided within the compartment of the vehicle.

SUMMARY OF THE INVENTION

The present invention has been developed in view of the facts as described hereinabove, and as its object, the provision of a seatbelt system consisting of the slide and guide rail, which are compact in volume and further have sufficient strengths, and capable of obtaining smooth travel of the slider.

In order to accomplish the above-described object, according to the present invention, in the seatbelt system, in which an end of an occupant restraining webbing is connected to a slide and this slider travels along a guide rail laid in or on a vehicular body so as to cause the webbing to approach or recede from the body of an occupant, the slider includes: a head crowned with first shoes; a body suspended from a central portion in cross-section of the head, crowned with a second shoe, with intermediate portion thereof between the head and a position of the body crowned with the second shoe being inserted through a driving tape; and a leg extended from the lower end of the body and secured with an anchor plate, to which the webbing is connected, and the guide rail includes: a substantially letter 'T' shaped sliding groove consisting of a head groove portion for slidably guiding the head of slider and a body groove portion for slidably guiding the body of slider; and a tape groove perpendicularly intersecting the body groove portion of the sliding groove for receiving and guiding the driving tape.

BRIEF DESCRIPTION OF THE DRAWINGS

The above-mentioned features and object of the present invention will become more apparent with reference to the following description, taken in conjunction with the accompanying drawings, wherein like reference numerals denote like elements, and in which.

DETAILED DESCRIPTION OF THE INVENTION

Description will hereunder be given of an embodiment of the present invention with reference to the drawings.

Figure 1:
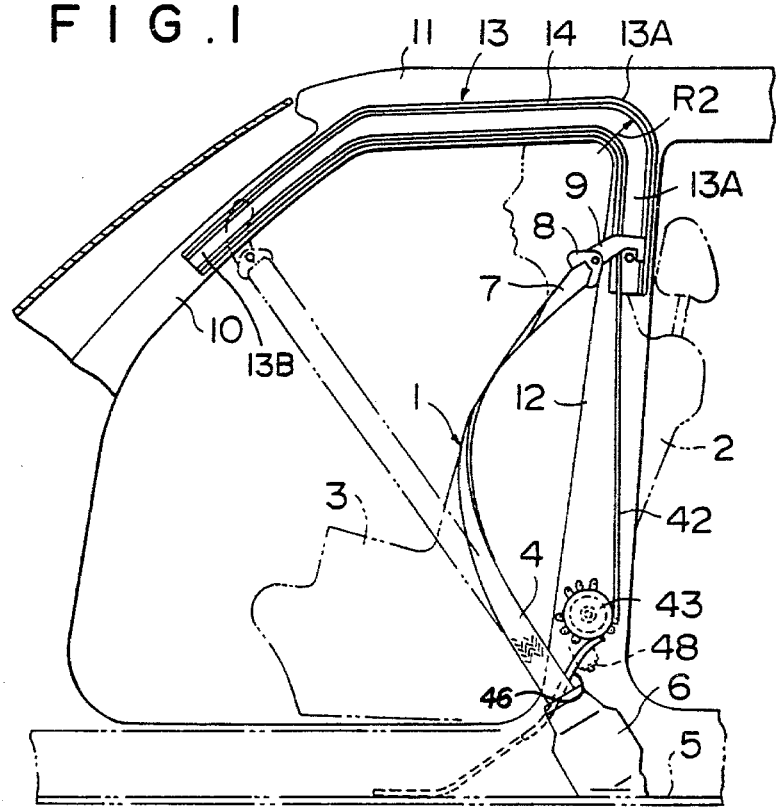
FIG. 1 is a side view showing an embodiment of the seatbelt system according to the present invention.

Referring to FIG. 1, an occupant restraining webbing 1 is adapted to be brought into obliquely surrounding contact with the body of an occupant 3 of a vehicle seated at an occupant's seat 2 so as to bring the occupant into a webbing fastened condition. An inner end 4 of the webbing 1 is wound up into a retractor 6 secured to a floor member 5 of the vehicle. This retractor 6 is disposed at the substantially central portion of the vehicle, and incorporates therein an inertia lock mechanism for winding up the webbing 1 by a bias and abruptly stopping the windoff of the webbing 1 in an emergency situation of the vehicle.

Figure 2:
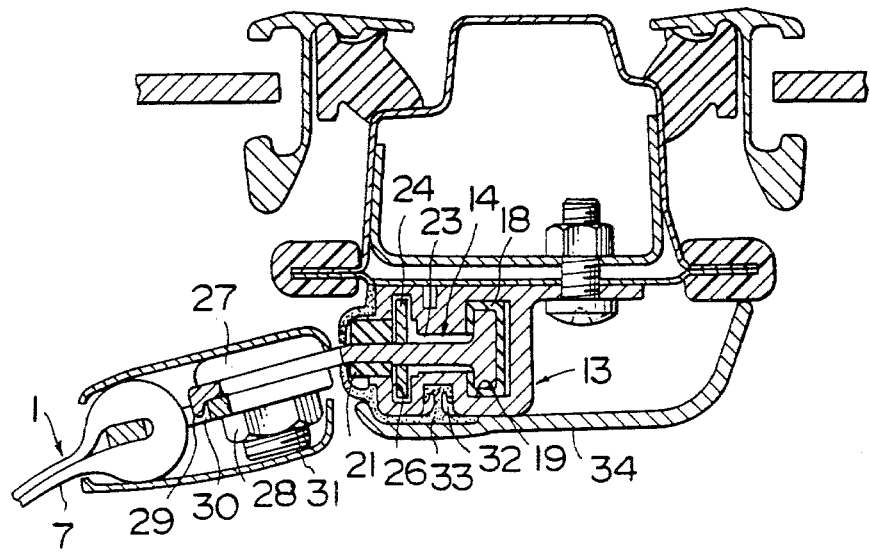
FIG. 2 is a cross-sectional view enlargedly showing the essential portions thereof.
Figure 3:
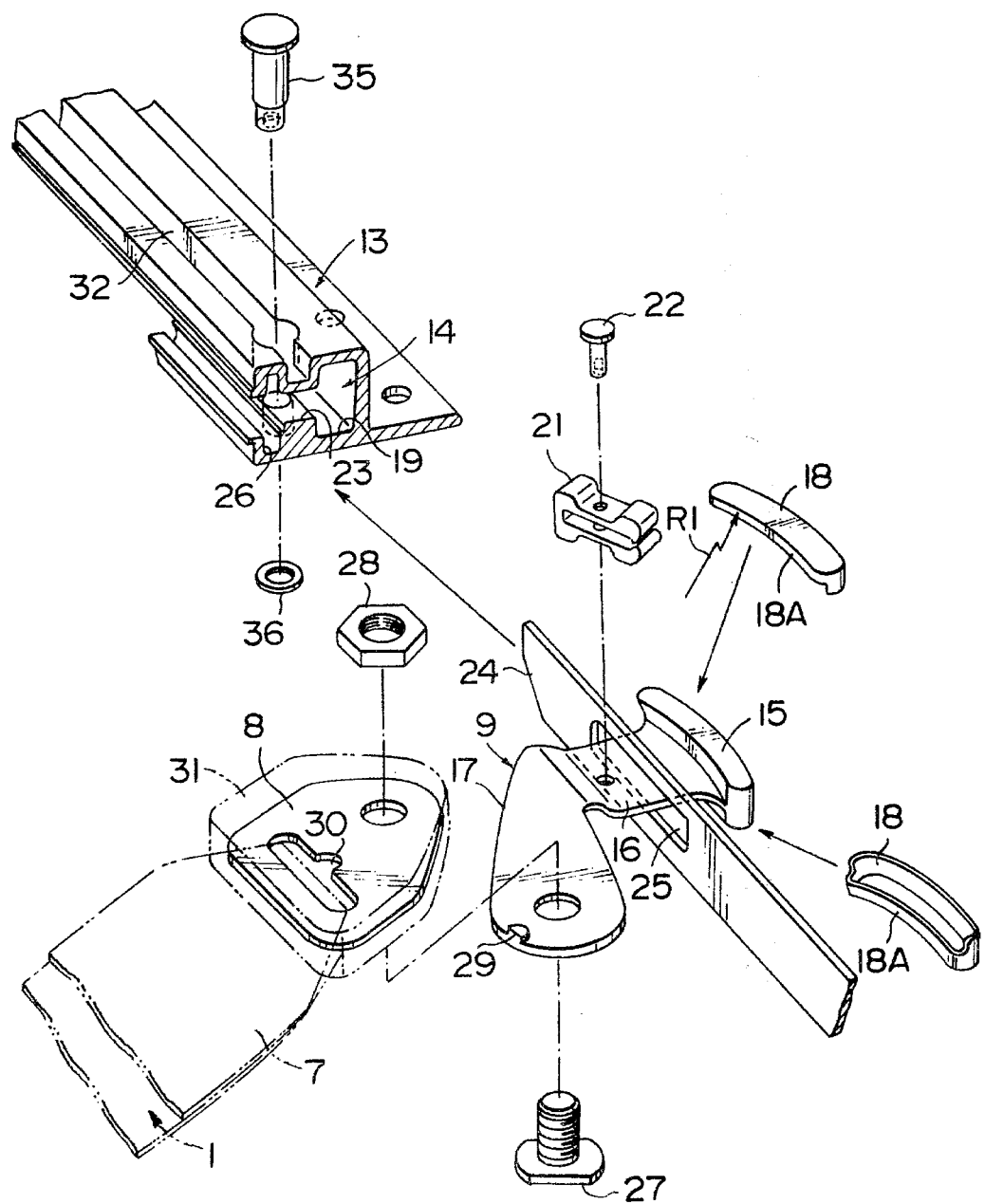
FIG. 3 is a perspective view showing the essential portions of FIG. 2 in disassembled conditions.

On the other hand, an outer end 7 of the webbing 1 is connected to a slider 9 through an anchor plate 8. The slider 9 is received in a guide groove 14 of a guide rail 13 laid on a front pillar 10, a roof-side 11 and a center pillar 12 of the vehicle as shown in FIGS. 2 and 3. This guide groove 14 is extended in a longitudinal direction of the guide rail 13, and the slider 9 is movable along this guide groove 14.

Figure 4A:
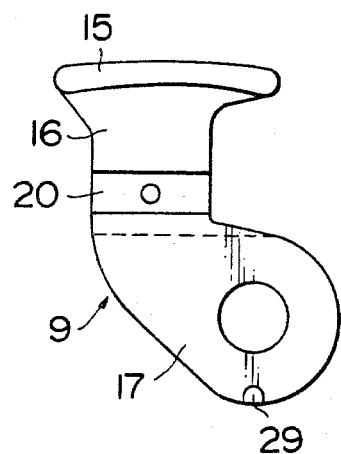
FIG. 4A is a front view showing the slider.
Figure 4B:
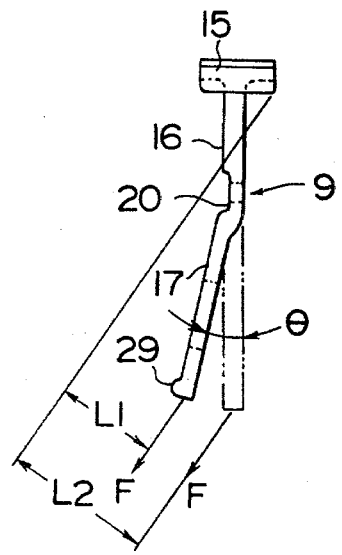
FIG. 4B is a side view of FIG. 4A.

As shown in FIGS. 4A and 4B, the slider 9 includes: a head 15; a body 16 suspended from the central portion in cross-section of the head 15 in substantially a letter 'T' shape; and a leg 17 extended from the lower end of the body 16. A pair of first shoes 18 are crowned onto the head 15 of the slider 9 from opposite sides, and these first shoes 18 are slidably received in a head groove portion 19 defining the innermost portion of the aforesaid guide groove 14 of the guide rail 13. A radius of curvature $R_1$ defined by an inner slidable surface 18A of the first shoes 18 is set at a smaller value than a radius of curvature $R_2$ defined by the head groove portion 19 of the guide groove 14, whereby opposite end portions of the first shoes 18 in the traveling direction of an inner slidable surface 18A are adapted to come into stably sliding contact with the head groove portion 19 over all the area of provision of the guide rail 13.

A mounting seat 20 is provided at the lower end of the body 16 of the slider 9, second shoe 21 is fastened to the mounting seat 20 from opposite sides, and solidly secured thereto with a rivet 22. This second shoe 21 is adapted to be slidably guided in the guide groove 14 to an opening of a body groove portion 23 formed into a substantially letter 'T' shape with the head groove 19.

These first and second shoes 18 and 21 are made of a synthetic resin material such as nylon, which is very low in frictional resistance, satisfactory in wear resistance, excellent in heat and cold resistance, and invariable in physical properties. Consequently, the slider 9, which is slidably guided in the guide groove 14 through these first and second shoes 18 and 21, can smoothly travel along the guide rail 13 in the longitudinal direction.

A portion of the body 16 of the slider 9 between the head 15 and the second shoe crowned position is inserted through an installing hole 25 being opened at the end of the driving tape 24. This driving tape 24 is movably received in a tape groove 26 perpendicularly intersecting the side surfaces of the intermediate portion of the body groove portion 23 in the sliding groove 14 of the guide rail 13 and extended in the longitudinal direction of the guide rail 13. More specifically, the driving tape 24 moves along the tape groove 26 in the longitudinal direction of the guide rail 13, so tht the slider 9 can move from a vertical retracting end 13A provided along the center pillar 12 of the guide rail 13 to a slanted advancing end 13B provided along the front pillar 10. The leg 17 of the slider 9 is bent at an angle $\theta$ with respect to the body 16 as shown in FIG. 4B, and the anchor plate 8 is connected to the lower end of the leg 17 through a bolt 27 and a nut 28. Since the leg 17 is bent with respect to the body 16, a distance $L_1$ between the acting line of a webbing tension F acting on the end of the slider 9 through the anchor plate 8 and the corner of the head 15 becomes smaller than a distance $L_2$ in the case the leg 17 is straight-lined with respect to the body 16, and consequently, a turning force of the webbing tension F to the corner of the head 15 becomes smaller, so that the action of the guide rail 13 tending to pry-open the sliding groove 14 can be decreased.

Although the aforesaid bolt 27 and nut 28 relatively rotatably mount the anchor plate 8 onto the slider 9, a projection 29 projects from the edge portion of the anchor plate 8 is engaged with a recess 30 provided in the anchor plate 8, whereby the position of the anchor plate 8 with respect to the slider 9 is fixed under normal use condition, so that the webbing 1 can be directed in the direction of not giving any uncomfortable feeling to the occupant 3. Further, in case the webbing tension F acts in an emergency situation of the vehicle, the projection 29 is broken away, whereby the anchor plate 8 rotates about the bolt 27 to a position indicated by two-dot chain lines in FIG. 5, thereby reliably restraining the occupant 3. In the drawing, designated as 31 is a cover.

A mounting groove or grooves 32 are continuously or intermittently formed in the outer side surface of the guide rail 13 in the longitudinal direction thereof, and base end of a lip 33 for covering the opening of the sliding groove 14 of the guide rail to improve the appearance is received and held in this mounting groove 32. Furthermore, the guide rail 13 and the lip 33 are covered by a side garnish 34. In addition, this mounting groove 32 can receive therein not only the lip 33 but also the guide rail covering member such as the side garnish 34.

Figure 5:
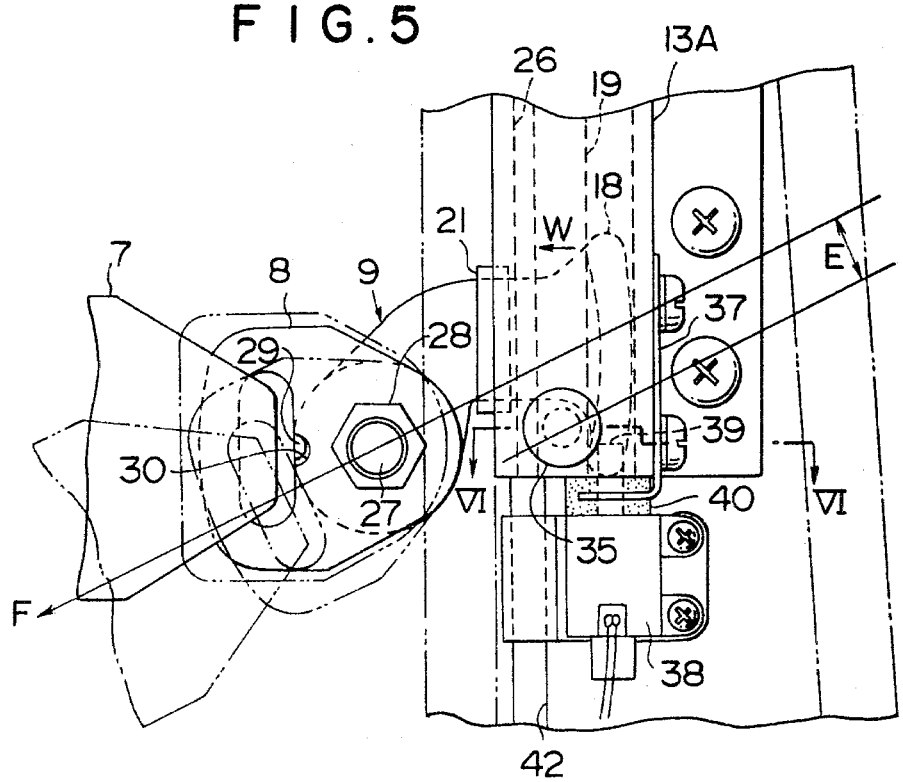
FIG. 5 is a side view showing a stopped condition of the slider at a guide rail retracting end.
Figure 6:
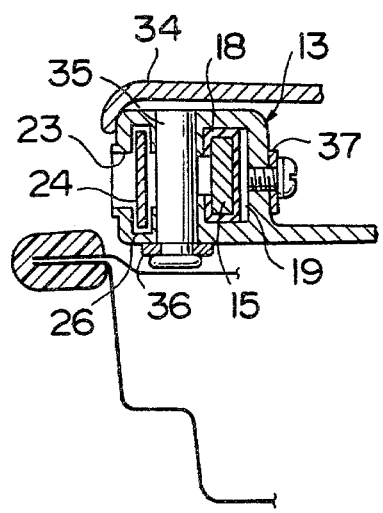
FIG. 6 is a sectional view taken along the line VI—VI in FIG. 5.

As shown in FIGS. 5 and 6, an anchor pin 35 engageable with the forward end of the head 15 of the slider 9 is solidly secured to the end portion of the retracting end 13A of the guide rail 13. This anchor pin 35 is provided in a condition of penetrating the body groove portion 23 between the head groove portion 19 of the guide rail 13 and the tape groove 26, improves the strength of the guide rail 13 to the action of the webbing tension F in an emergency situation of the vehicle, and can finally be engage and hold the forward end of the head 15 off the slider 9. As viewed from the position, where the anchor pin 35 is provided, the position, where the bolt 27 for mounting the anchor plate 8 onto the slider 9 is mounted, is disposed close to the anchor pin 35, so that a distance E can be small which is defined by the acting line of the webbing tension F passing through the center axis of this bolt 27 and the center axis of the anchor pin 35, thereby enabling to decrease the action W exerted on the head groove 19 of the guide rail 13 by an end of the head 15 when the forward end of the head 15 of the slider 9 is engaged and held by the anchor pin 35.

Furthermore, a stop switch 38 is provided on the end portion of the retracting end 13A of this guide rail 13 through a mounting bracket 37, an actuator 39 of the stop switch 38 is provided in a manner to be movable into the head groove portion 19 of the guide rail 13, and damper rubbers 40 are provided at the side of an opening of the head groove portion 19. More specifically, when the slider 9 reaches the retracting end 13A of the guide rail 13, the forward end of the first shoes 18 crowned on the head 15 pushes in the actuator 39 to stop the movement of the driving tape 24, the moving inertia force thereof is absorbed by the damper rubbers and is stopped at a position adjacent the anchor pin 35 in a static state.

Figure 7:
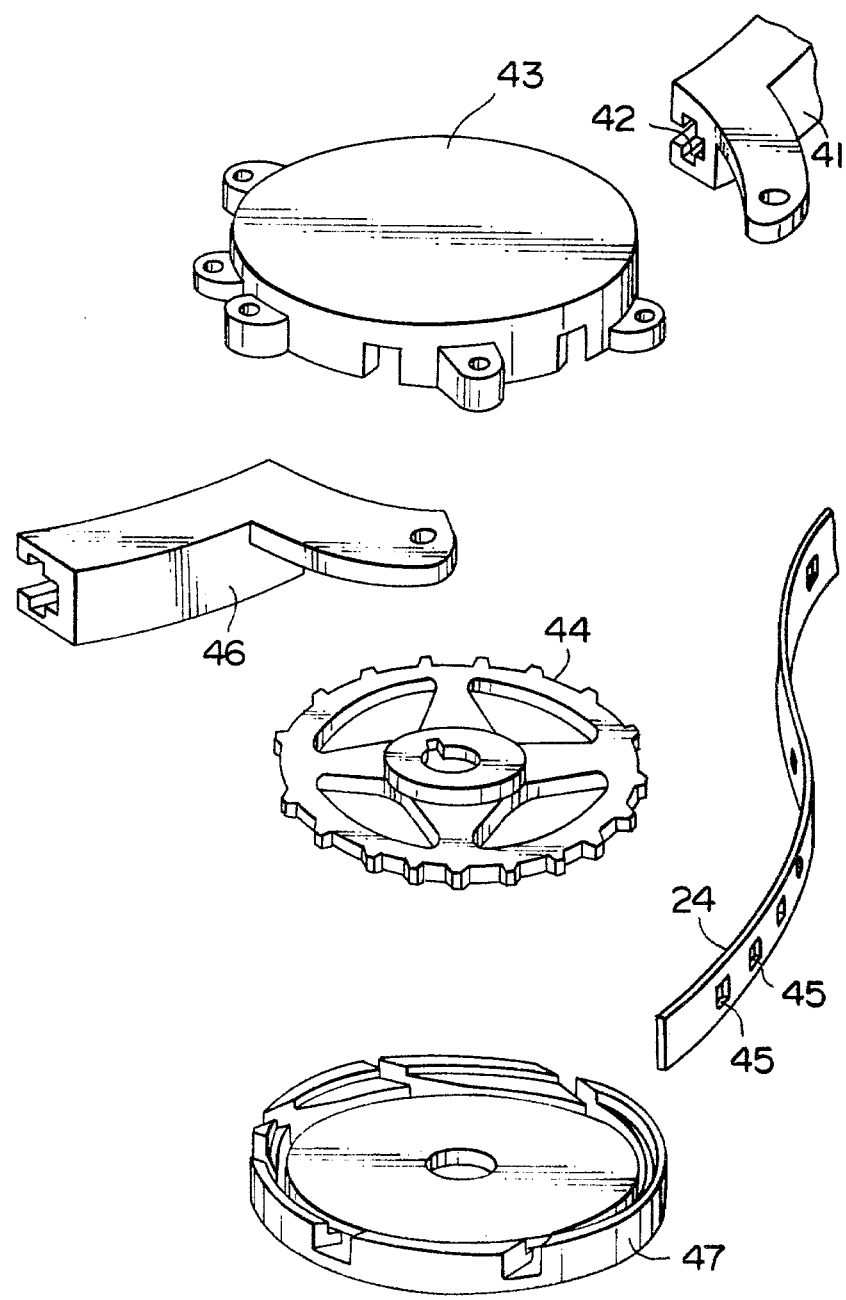
FIG. 7 is a perspective view showing the combined relation of the driving tape with the sprocket wheel in disassembled conditions.

Further, connected to the retracting end 13A of the guide rail 13 is a tape guide 41 as shown in FIG. 7, in which a tape track 42 is formed and connected to the tape groove 26 of the guide rail 13. The lower end of this tape guide 41 is in contact with a sprocket housing 43 secured to the lower portion of the center pillar 12, and rectangular openings 45 of the driving tape 24 are caused to mesh with the sprocket wheel 44 pivotally supported in this sprocket housing 43.

Further connected to this sprocket housing 43 is a tape guide 46, into which the driving tape 24 after meshing with the sprocket wheel 44 is pushed. The sprocket wheel 44 in the sprocket housing 43 is adapted to be rotated by an output shaft of a motor 48 extending through a cap 47, rotation of this sprocket wheel 44 causes the driving tape 24 to move along the guide rail 13, and tape guides 41, 46, whereby the slider 9 is moved between the retracting end 13A and the advancing end 13B of the guide rail 13 as described above.

The motor 48 is adapted to be operated by an action of detecting the conditions of the occupant entering or leaving the vehicle. For example, when the occupant closes the door upon being seated, the sprocket wheel 44 is turned in the clockwise direction in FIG. 1, whereby the slider 9 is moved toward the retracting end 13A of the guide rail 13, and stopped at the retracting end by the operation of the aforesaid stop switch 38. And, when the occupant opens the door, the sprocket wheel 44 is turned in a direction opposite to the above, whereby the slider 9 is moved toward the advancing end 13B of the guide rail 13.

Description will hereunder be given of operation of the abovedescribed embodiment. In the case the occupant enters the vehicle, if he closes the door upon being seated, the driving tape 24 driven by the motor 48 causes the slider 9 and the anchor plate 8 toward the retracting end of the guide rail 13, whereby the webbing 1 is fastened to the occupant as shown in FIG. 1. Here, the driving tape 24 for imparting the driving force to the slider 9 is connected to the body 16 of the slider 9 at an intermediate portion between the position, where the first shoes 18 slidable in the sliding groove 14 of the guide rail 13 is mounted, and the position, where the anchor plate 8 connected to the webbing 1 is mounted, so that the driving force of the driving tape 24 is stably imparted to the slider 9, thereby enabling the slider 9 to smoothly move in the guide rail 13. Furthermore, the first shoes 18 fastened to the head 15 of the slider 9 are slidably supported in the head groove portion 19 of the guide rail 13 in a manner to be projected in opposite directions with respect to the body 16, whereby the slider 9 is stably supported in the widthwise direction of the cross-section of the guide rail 13, so that the slider 9 can smoothly move. Furthermore, the radius of curvature $R_1$ of the inner sliding surface of the first shoes 18 is set at a value smaller than radius of curvature $R_2$ of the sliding groove 14 of a curved portion of the guide rail 13, and hence, even in the curved portion, the inner sliding surface of the first shoes 18 is two-point supported at opposite ends in the traveling direction thereof. Consequently, the slider 9 is always smoothly movable in a stabilized condition in the traveling direction thereof. Further, the slider 9 slides in the sliding groove 14 of the guide rail 13 through the first shoes 18 and second shoe 21, so that the frictional resistance thereof during travel can be reduced, thus enabling the slider 9 to move smoothly.

Furthermore, the damper rubbers 40 are provided at the end portion of the retracting end 13A of the guide rail 13, whereby the moving inertia force of the slider 9 is absorbed by the damper rubbers 40, thereby enabling to stop the slider 9 quietly.

If the occupant changes his driving posture in the condition that the webbing 1 is fastened to the occupant as described above, if the upper half body of the occupant is moved, then the inner end 4 of the webbing 1 can be wound off from the retractor 6 against the windup bias. In this case, the slider 9 is inserted in the vertical retracting end 13A of the guide rail 13, whereby the anchor plate 8 is prevented from moving back and forth in the vehicle. Furthermore, in the webbing fastened condition as described above, due to the engagement of the projection 29 of the slider 9 with the recess 30 of the anchor plate 8, the direction of the anchor plate 8 mounted on the slider 9 is regulated in a predetermined direction, whereby the occupant does not feel unpleasant by the webbing 1 fastened to him.

Next, in an emergency situation such as a collision, the inertia lock mechanism in the retractor 6 abruptly stops the windoff of the webbing 1, so that the webbing 1 can be reliably fastened to the occupant. More specifically, the outer end 7 of the webbing 1 is engaged with the anchor plate 8, and this anchor plate 8 is received in the vertical retracting end 13A of the guide rail 13, whereby the anchor plate 8 is prevented from moving back and forth in the vehicle, so that the occupant will not be thrown out forward in the vehicle, thus enabling him to avoid from being collided with dangerous objects. Here, a high webbing tension F acts on the anchor plate 8, whereby the projection 29 of the slider 9 is broken away and released from the engagement with the recess 30, and the anchor plate 8 is rotated relative to the slider 9, so that the webbing 1 can be moved in the direction of reliably restraining the occupant. In addition, an anchor pin 35 is provided in the retracting end 13A of the guide rail 13, whereby the strength of the guide rail 13 is improved, so that even the high tension F will not open the guide rail 13, thus enabling the guide rail 13 to reliably hold the slider. Furthermore, the position, where the anchor plate 8 is mounted on the slider 9, is arranged such that the acting line of the webbing tension F is close to the position, where the anchor pin 35 is provided, whereby a load imposed on the sliding groove 14 by an end of the head 15, which is opposite to the forward end engaging the anchor pin 35, is reduced. Furthermore, the leg 17 of the slider 9 is bent with respect to the body 16, whereby the turning force rendered by the head 15 of the slider 9 in the widthwise direction of the cross-section of the slider 9 is reduced, so that, even if the guide rail 13 is rendered compact in volume, the strength thereof can be secured.

In the case the vehicle completes a normal drive and the occupant leaves the vehicle, the action of opening the door actuates the motor 48, whereby the slider 9 is moved through the movement of the driving tape 24 toward the advancing end 13B of the guide rail 13, so that the webbing 1 can be stopped in a condition indicated by two-dot chain lines in FIG. 1, thereby enabling the occupant to leave the veicle. In this case also, the slider 9 is smoothly movable in the same manner as in the case the occupant enters the vehicle and the slider 9 is moved to the retracting end 13A of the guide rail 13.

Figure 8:
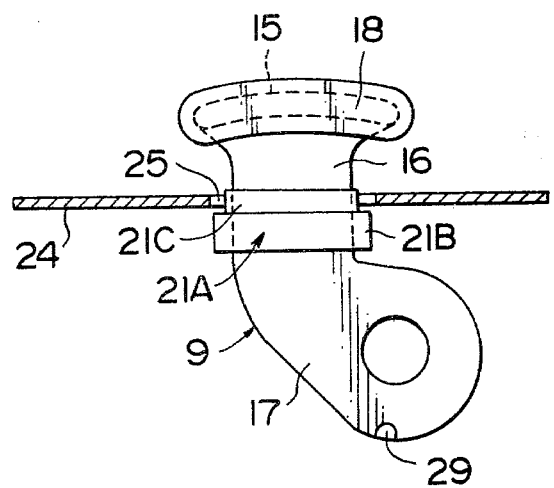
FIG. 8 is a side view showing another type of intersection of the driving tape into the slider.

In addition, in the abovedescribed embodiment, the portion of the body 16 between the head 15 and the second shoe 21 is directly inserted through the driving tape 24. However, as shown in FIG. 8, such an arrangement may be adopted that a second shoe 21A is formed to provide a slidable portion 21B and a stepped portion 21C, this stepped portion 21C between the head 15 and a slidable portion 21B is inserted through the driving tape 24, and the driving tape 24 is brought into contact with the stepped portion 21C of the second shoe 21A made of nylon or the like.

As has been described hereinabove, the seatbelt system according to the present invention, such advantages can be offered that the slider and the guide rail, both of which are rendered compact, secure sufficient strengths and the slider 9 is smoothly movable along the guide rail.

It should be apparent to one skilled in the art that the above-described embodiment is merely illustrative of but a few of the many possible specific embodiments of the present invention. Numerous and varied other arrangements can be readily devised by those skilled in the art without departing from the spirit and scope of the invention.

What is claimed is:

1. A seatbelt system, wherein an end of an occupant restraining webbing is connected to a slider and said slider travels along a guide rail laid on a vehicle body so as to cause the webbing to approach or recede from the body of an occupant, being of such an arrangement that:

said seatbelt system comprises a head, a body suspended from a central portion in cross-section of the head and inserted through a driving tape; and a leg extended from the lower end of the body secured with an anchor plate, to which the webbing is connected; and said guide rail comprises a substantially letter 'T' shaped sliding groove including a head groove portion for slidably guiding the head of slider and a body groove portion for slidably guiding the body of slider and a tape groove perpendicularly intersecting the body groove portion of the sliding groove for receiving and guiding said driving tape.

2. The seatbelt system as set forth in claim 1, wherein first shoes are crowned onto said head of slider, a second shoe is crowned onto the body and an intermediate portion thereof between the head and a position, where the second shoe is crowned, is inserted through said driving tape.

3. The seatbelt system as set forth in claim 1, wherein a slidable surface of said first shoes is formed into a circularly arcuate surface having a radius of curvature smaller in value than a radius of curvature of a curved portion of the guide rail.

4. The seatbelt system as set forth in claim 1, wherein said leg of slider and said anchor plate are held in a predetermined positional relationship through engageable portions releasable by the action of a webbing tension in an emergency of the vehicle.

5. The seatbelt system as set forth in claim 1, wherein an anchor pin engageable with the head of slider is provided in the retracting end of the slider of said guide rail.

6. The seatbelt system as set forth in claim 1, wherein a position, where the anchor plate is mounted on the slider, is arranged such that the acting line of the webbing tension is close to a position, where the anchor pin is provided.

7. The seatbelt system as set forth in claim 1, wherein said leg of slider is bent with respect to the body of slider.

8. The seatbelt system as set forth in claim 1, wherein a groove portion for holding a guide rail covering member is formed at the outer surface of said guide rail.

9. The seatbelt system as set forth in claim 1, further comprising a first shoe attached on said head of said slider to slide within said head groove portion, and a second shoe attached on said body of said slider to slide within said body groove portion.

* * * * *